July 23, 1935.  C. J. MARTIN ET AL  2,009,091

SHOCK ABSORBER

Filed June 16, 1934  2 Sheets—Sheet 1

INVENTORS
Curtis J. Martin
Harry J. Nimzik.
BY Darby & Darby
ATTORNEYS.

July 23, 1935.  C. J. MARTIN ET AL  2,009,091

SHOCK ABSORBER

Filed June 16, 1934  2 Sheets-Sheet 2

INVENTORS
Curtis J. Martin
Harry J. Nimzik
BY
Darby & Darby
ATTORNEYS.

Patented July 23, 1935

2,009,091

UNITED STATES PATENT OFFICE 2,009,091

SHOCK ABSORBER

Curtis J. Martin, Chicago, Ill., and Harry J. Nimzik, Rahway, N. J., assignors to National Pneumatic Company, New York, N. Y., a corporation of West Virginia Application June 16, 1934, Serial No. 730,884

12 Claims. (Cl. 188—88)

This invention relates to improvements in shock absorbers of the pneumatic type.

The basic object of this invention is to provide an extremely simple shock absorber structure in which the air in the shock absorber cylinder is always at superatmospheric pressure.

An important object of the invention is the provision of a valved piston structure constructed so that the normal movement of the piston creates and maintains the super-atmospheric pressure in the shock absorber cylinder.

A further object of this invention is to provide a structure of this type completely sealed against intentional escape of air from the cylinder.

A still further object of the invention is to provide a piston and piston rod structure in combination with valves so that air under certain conditions will be fed into either end of the shock absorber cylinder from the atmosphere.

A subsidiary object is to provide a structure in which the supply of air from the atmosphere to the shock absorber cylinder is solely under the control of the movements of the valved piston.

These and many other objects as will appear from the following disclosure are secured by means of this invention.

This invention resides substantially in the combination, construction, arrangement and relative location of parts, all as will be set forth in greater detail hereinafter.

The fundamental object of this invention is to provide an improved form of shock absorber in which the shock absorbing and snubbing action thereof is such that in case of application thereof to an automobile, for example, the riding qualities of the vehicle over even the roughest roads, are greatly improved. With the structure of this invention the volume of air or other fluid trapped in the shock absorber cylinder is at super-atmospheric pressure. This condition of super-atmospheric pressure is created solely by the oscillation of the piston within the cylinder.

Furthermore, in accordance with this invention both ends of the cylinder are connectible with the atmosphere through valve controlled passages so that a sub-atmospheric pressure condition may never exist for any appreciable period of time.

Furthermore, in accordance with this invention the two ends of the cylinder are connectible through a valve passage in the piston so that the pressure in the non-load bearing end of the cylinder may never more than momentarily exceed the pressure in the load bearing end of the cylinder. These operational conditions are established by means of valves, as will be described, which are solely actuated by fluid pressure for both their seating and unseating movements. It is by a structure embodying the above features that the present invention imparts easier riding qualities to an automobile, for example, even when operating over the roughest kind of roads. At this point it is noted that, as is apparent to those skilled in the art, this invention is in no sense limited to use on an automobile, since, of course, it may be used on any vehicle, or, for absorbing the shocks imparted to any movable member, or pair of relatively movable members. It may likewise be used either in combination with or independently of springs such as the usual automobile leaf springs in the case of an automobile.

Figure 1:
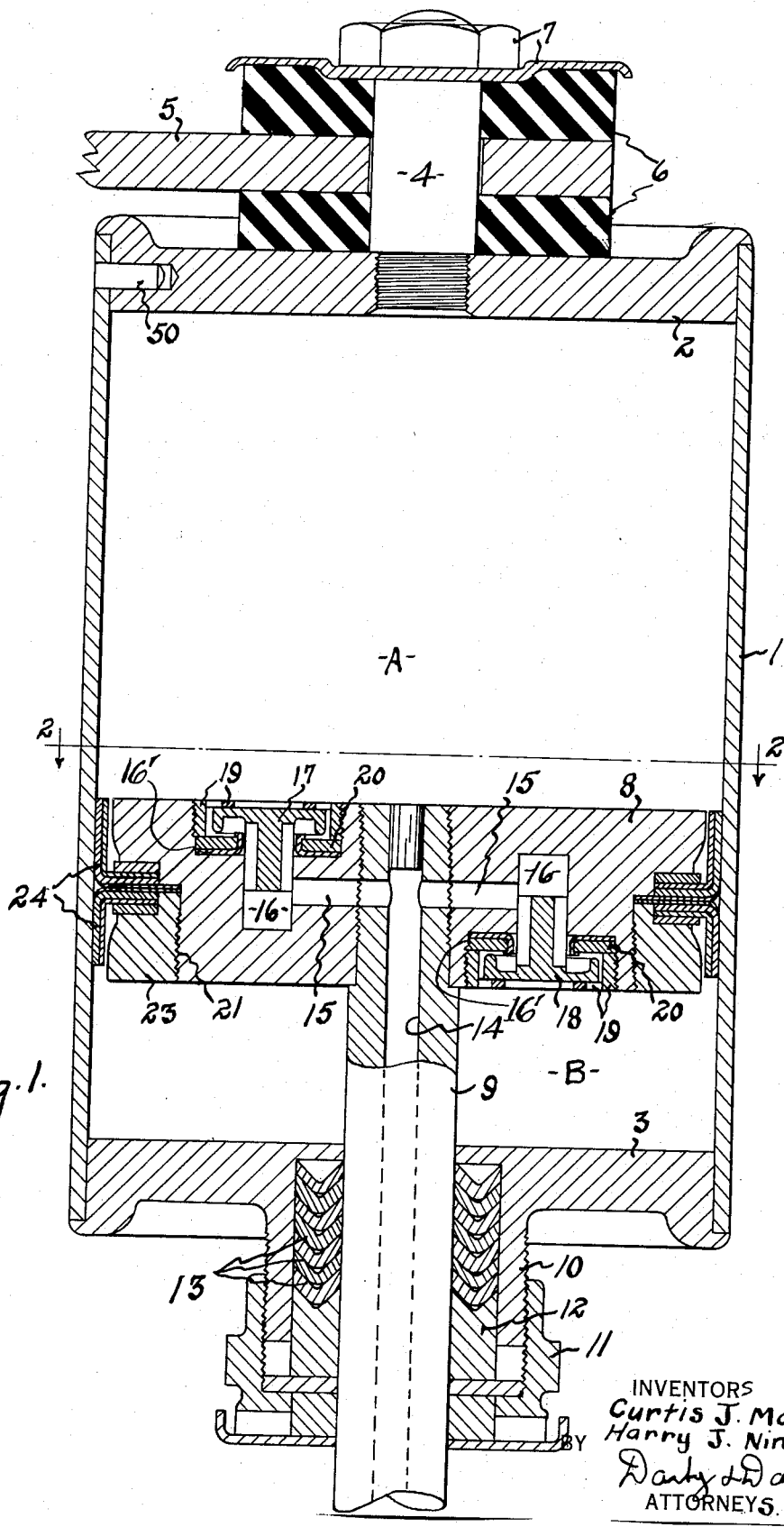
Figure 1 is a vertical cross sectional view taken on the line 1—1 of Fig. 2.

The structure by means of which these operations are accomplished will now be described in connection with the attached drawings. At 1, Fig. 1, is a shock absorber cylinder closed at one end by the end wall 2 and at the other end by the end wall 3. These end walls may be locked in place by means of pins 50, for example, and hermetically sealed with the cylinder in accordance with many well known methods so that the cylinder itself is as completely sealed against the entrance or exit of air at the joints between the end walls and the cylinder wall as is practically possible to make.

Instead of pins the end walls may be attached to the ends of the cylinder by threads, they may be welded thereto, formed integral therewith, or they may be pressed into place and held by screws, pins, or the like as is well known in this art.

The end wall 2 is provided with a stud 4 rigidly secured thereto, by means of which the arm 5 is connected to the cylinder. This arm is preferably locked between blocks of rubber or other resilient material 6, which parts are held firmly on the stud by means of the washer or plate and locked nut 7. The end wall 3 is provided with a central externally threaded hollow hub 10 which is engaged by means of a packing gland nut 11, which engages a presser block 12 for compressing the washers or packing material 13 by means of which as tight a seal around the piston rod is secured as is practically possible. This packing gland structure may be made in many forms in accordance with knowledge well known in the art.

Within the cylinder is a piston 8 which is firmly secured to the piston rod 9. The piston rod 9 has a passage 14 therethrough opening at one end to the atmosphere and at the other end to a pair of chambers in the form of radial slots 15 which emerge into passages 16. The passages 16 terminate at one end within the piston and emerge at the other end into enlarged or counter-bored recesses 16' as shown. Slidably mounted in the passages 16 are the valves 17 and 18 which have fluted stems and terminate in mushroom heads having annular seating surfaces as shown. Within the enlarged counter-bores are locked the washers 20 which may be made of any suitable material by means of the rings 19 which threadedly engage the walls of the counter-bore. These rings are in the form of caps having openings in the end wall as is clear from Figures 1 and 2.

The seating surface of the valves 17 and 18 are positioned as shown to engage the seats 20.

The piston 8 is provided at one side with a peripheral groove to form a central projecting member which is externally threaded as indicated at 21. This central projection affords means of attachment for the internally threaded ring 23 by means of which the piston washer or cap structure 24 is firmly clamped to the piston. This structure merely comprises one of many well known forms of piston structures by means of which this invention may be embodied in physical form. As is clear from Figure 1, the external diameter of the piston is slightly less than the internal diameter piston cups so that the fluid pressure in the cylinder ends may act to aid in firmly seating the cup flanges against the cylinder wall so as to prevent the exchange of fluid between the cylinder ends at this point.

Figure 2:
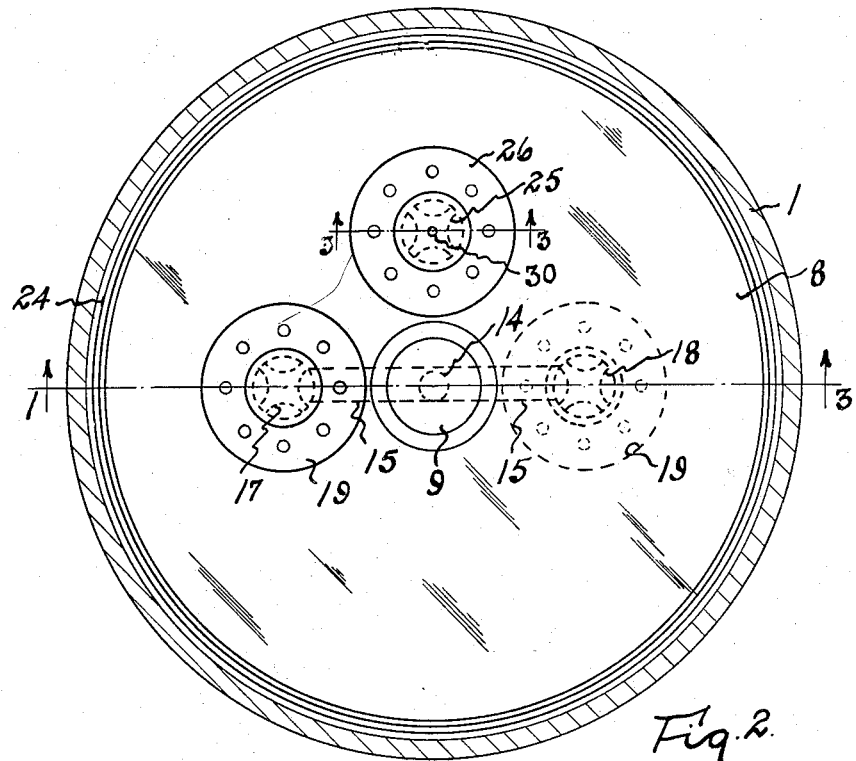
Figure 2 is a horizontal cross sectional view taken on the line 2—2 of Fig. 1.
Figure 3:
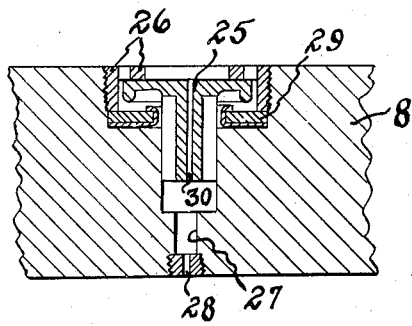
Figure 3 is a vertical cross sectional view through a portion of the piston taken on the line 3—3 of Fig. 2.

As is clear from Figures 2 and 3 the piston is provided with an additional passage and valve. This passage 27 extends entirely through the piston 8 and is provided with several different diameters so as to support the mushroom valve 25 which has a fluted stem as before. The seat is provided for this valve in an enlarged counterbore by the washer 29 which, as before, is locked in place by a cap 26 having openings in the end wall thereof. The passage 27 is provided with a plug having a restricted bore 28 therethrough of the size of approximately a number 40 drill. The stem of valve 25 is provided with a smaller passage 30 therethrough of approximately a number 60 drill. As is of course apparent the heads of the valves 17, 18 and 25 are of such diameter as to permit free flow of air past them when unseated.

The operation of this structure will be described in connection with its use on an automobile for purposes of explanation. The lower end of the piston rods 9 which will be provided with suitable attaching means, as is well known in the art, is secured for example to the axle of the vehicle. The arm 5 of the shock absorber is attached to the chassis. When the vehicle is normally loaded, the air trapped in the upper end of the cylinder or the load bearing end, as indicated at A, is under super-atmospheric pressure and the piston is approximately at the center of the cylinder. The pressure in chamber A will hold valves 17 and 25 seated. The pressure in the lower end of the cylinder, or the snubbing end indicated at B will be at least at atmospheric pressure since it cannot be lower than atmospheric pressure in view of the position of the valve 18. Thus, if the pressure in chamber B is below atmospheric pressure, air will enter that chamber, through chamber 14, passage 15, right hand passage 16 and around valve 18 which will be open by the atmospheric pressure and into the chamber B. As an actual matter of fact, the pressure on each side of the valve 18 will be the same so that under its own weight, it will be in open position as indicated in the figure.

When the wheels of the vehicle strike an irregularity in the road they will be thrown towards the vehicle chassis. This will move piston 8 upwardly increasing the pressure in chamber A and decreasing the pressure in chamber B. The result is that additional air will rush into chamber B from the atmosphere through the piston rod. This upward movement of the piston will continue until the pressure in chamber A has built up to the point to stop further movement of the piston, and, of course, the axle and wheels connected thereto.

The force of the blow having been spent the compressed air in chamber A will start the piston downward, immediately closing valve 18 if it is not already closed. Thus, as the pressure is falling in chamber A it is rising in chamber B. If in this return or snubbing stroke the pressure in chamber B should exceed the pressure in chamber A, valve 25 will unseat permitting air to flow directly through the piston by way of passage 27 from chamber B to chamber A. The rate of flow of the air through passage 27 will be restricted by the speed plug 28 of Figure 3 so that the rush of air will not be too rapid. As will be apparent, if the exchange of air from chamber B to chamber A is too rapid, effective snubbing action is prevented. By thus slowly relieving the pressure in chamber B during the snubbing or return stroke, the action of the shock absorber will not be abrupt. As is well known in this art, the uncomfortable riding qualities of the vehicle are more due to abrupt snubbing action than to the direct shock absorbing action of the shock absorbers.

During the time that the piston 8 is being brought to a stop during the return or snubbing action, the pressures in chambers A and B will become balanced so that no further transfer of air occurs. Immediately the piston 8 starts travelling upwardly again, valve 25 will close. If during this movement, because of loss of air from chamber B the pressure falls below the atmospheric pressure, fresh air may enter through the piston and valve 18 as described before.

It is important to note that neither end of cylinder I has any passages either with or without valves through which air may be discharged from the cylinder. Hence, the only loss of air from the cylinder is through any inherent leakage which those skilled in the art realize is practically inevitable under the conditions of operation to which the structures are subjected. Practically, of course, the cylinder may be hermetically sealed. However, where the vehicle stands without use for a long period of time, it is quite likely that air will gradually escape from the cylinder. However, immediately the vehicle is put into use, super-atmospheric pressure conditions will again be created in chambers A and B.

The purpose of the small passage 30 is to permit a gradual bleeding of air from chamber A into chamber B when the vehicle is at rest. It has been found that after a period of operation, especially over relatively smooth roads, that the pressure in chamber A tends to build up undesirably. This condition is relieved by a gradual and slow bleeding of air from chamber A into chamber B, particularly when the vehicle is at rest. Passage 30 is too small, however, to have any effect upon the normal operation of the device except possibly when the vehicle is running over very smooth surfaces.

Careful consideration will disclose that the piston operates as a pump and it is the normal movements of the piston which create and maintain super-atmospheric conditions in chambers A and B. The proper pressure in chamber A to meet the most difficult road conditions will be supplied first to chamber B through the piston rod and then to chamber A through the piston as previously described.

It is noted that in describing the operation of this device it has been assumed for purposes of simplicity, that the cylinder is fixed and only the piston moves up and down. Of course, in use, both elements move relatively to each other, but the operation is the same as described above.

From the above description it will be apparent that this invention resides in certain principles of construction and operation which may be carried out by those skilled in the art with other physical structures. We do not, therefore, desire to be strictly limited to the disclosure as given for purposes of illustration, but rather to the scope of the appended claims.

What we seek to secure by United States Letters Patent is:

1. A shock absorber as described comprising a closed air tight cylinder, a movable piston in said cylinder, and means entirely mounted upon and actuated by the movement of the piston for creating and maintaining super-atmospheric conditions in both ends of the cylinder.

2. A shock absorber as described comprising a sealed cylinder, a piston movably mounted in said cylinder, and means mounted on said piston and operated by the movement thereof for creating and maintaining super-atmospheric pressure conditions in both ends of the cylinder.

3. A shock absorber as described comprising a cylinder, a piston movably mounted therein and normally closed valve means on said piston whereby movements of the piston create and maintain super-atmospheric pressure in both ends of the cylinder.

4. A shock absorber as described comprising a sealed cylinder, a piston slidably mounted therein and sealing the cylinder ends against communication, a piston rod projecting externally of the cylinder and having a passage therein terminating in chambers in the piston, separate passages from said chambers into opposite ends of the cylinders and a valve in each of said passages.

5. A shock absorber as described comprising a sealed cylinder, a piston slidably mounted therein, a piston rod projecting externally of the cylinder and having a passage therein terminating in a chamber in the piston, a separate passage from said chamber into each end of the cylinder and a valve in each of said passages seating in opposite directions.

6. A shock absorber as described comprising a sealed cylinder, a piston slidably mounted therein, a piston rod projecting externally of the cylinder and having a passage therein terminating in chambers in the piston, separate passages from said chambers into opposite ends of the cylinder, said piston having a passage therethrough and valves in said passages.

7. In a shock absorber, a hermetically sealed cylinder, a piston slidably mounted in said cylinder, the piston rod having a passage therethrough opening at one end to the atmosphere and at the other end to a pair of passages in said piston, the passages in said piston opening into opposite ends of the cylinder respectively and valves in said passages operable by the pressure in the respective ends of the cylinders to be seated thereby, whereby superatmospheric pressure is created and maintained in both ends of said cylinder.

8. In a shock absorber, a hermetically sealed cylinder, a piston slidably mounted in said cylinder, the piston rod having a passage therethrough opening at one end to the atmosphere and at the other end to passages in said piston respectively, the passages in said piston opening into opposite ends of the cylinder, valves in said passages, said piston having a passage extending entirely therethrough and a valve in said passage operable to closed position by the pressure in one end of said cylinder whereby superatmospheric pressure is created and maintained in both ends of said cylinder.

9. A shock absorber as described comprising an air tight cylinder, a piston in said cylinder, a piston rod connected thereto having a passage therethrough, opening into atmosphere at one end and into passages in the piston which are only open to opposite ends of the cylinder and valves in the passages in the piston, positioned to be seated by the pressure in the respective ends of the cylinder.

10. A shock absorber as described comprising an air tight cylinder, a piston having an air tight sliding fit with the cylinder, a piston rod connected thereto having a passage therethrough, opening into atmosphere at one end and into passages in the piston which are separately open to opposite ends of the cylinder, valves in the piston passages and a passage extending entirely through the piston and a valve therein operable to closed position by the pressure in one end of said cylinder.

11. A shock absorber as described, comprising a cylinder, a piston movably mounted therein, means on said piston for creating and maintaining super-atmospheric pressure in both ends of the cylinder and means for equalizing pressure in the cylinder ends.

12. A shock absorber of the type described, comprising a sealed cylinder having a piston movably mounted therein, means for creating super-atmospheric pressure conditions in both ends of the cylinder under the movement of said piston, means for directly connecting both ends of the cylinder together when the pressure in one end exceeds the pressure in the other end, and means for gradually bleeding air from either end of the cylinder to the other end of the cylinder.

CURTIS J. MARTIN.
HARRY J. NIMZIK.